Oct. 17, 1961   V. E. SPROUSE ET AL   3,004,748
FLOAT VALVE
Filed July 16, 1959
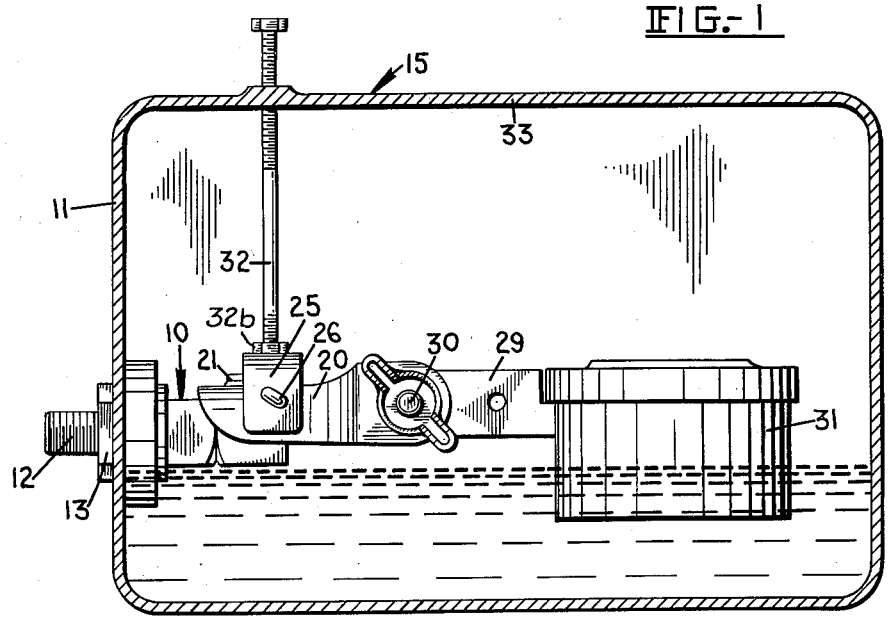
FIG.-1
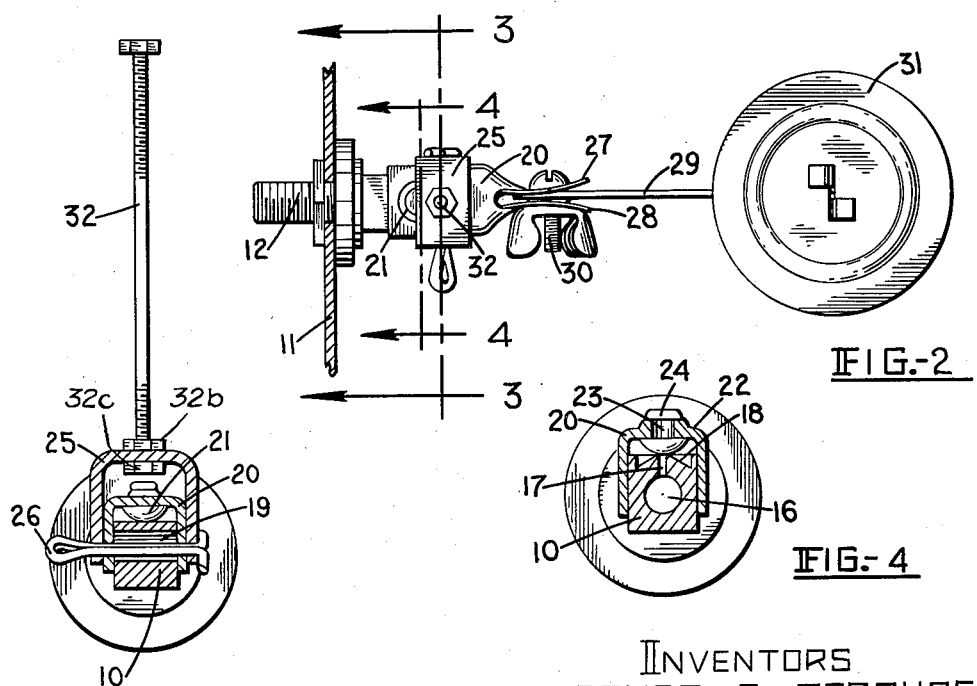
FIG.-2
FIG.-3
FIG.-4
INVENTORS
VERNER E. SPROUSE
EVERETT D. WISEMAN
BY Herbert A. Minturn
ATTORNEY

United States Patent Office 3,004,748
Patented Oct. 17, 1961

3,004,748
FLOAT VALVE
Verner E. Sprouse and Everett D. Wiseman, Columbus, Ind., assignors to Vernco Corporation, Columbus, Ind., a corporation of Indiana
Filed July 16, 1959, Ser. No. 827,524
1 Claim. (Cl. 251—234)

This invention relates to a float valve of the type which is normally operated by a float in a tank containing a liquid where the level of the liquid is to be controlled within prescribed limits, the upper limit being variable by means of an adjustment of the valve.

A primary object of the invention is to provide a valve structure which may be readily adjusted to give variable level heights by simply adjusting a control member or rod. By use of the present invention, the valve may be adjusted without having to enter the tank, or disassemble any parts connected with the valve.

A further primary advantage of the invention resides in the fact that the structure may be produced at a relatively low cost. The adjustment may be held without changing over long periods of time.

These and many objects and advantages of the invention will become apparent to those versed in the art in the following description of one particular form of the invention, with reference being made to the accompanying drawing, in which FIG. 1 is a vertical section through a tank to which the invention applied;

FIG. 2 is a top plan and partial sectional of the structure embodying the invention;

FIG. 3 is a view on a slightly enlarged scale in section on the line 3—3 in FIG. 2; and FIG. 4 is a view in section on the line 4—4 in FIG. 2.

A valve body generally designated by the numeral 10 is fixed to a tank wall 11, herein shown as being a vertical wall. The valve body 10 has a screw-threaded portion 12 passing through the wall 11 with a lock nut 13 securing the body rigidly to the wall. The valve body 10 extends horizontally within the tank 15. The valve body 10 in the form herein shown is rectangular in vertical section, and has a fluid entrance extending through the threaded portion 12 into the valve body by the passageway 16. The inner end of the body 10 is closed, and there is a vertical passageway 17, FIG. 4, leading from the horizontal passageway 16 to open at the top centrally of a conical valve seat 18.

The inner end portion of the valve body 10 has a transverse slot 19 therethrough with its major dimension extending vertically, FIG. 3.

A yoke 20 freely extends downwardly over the body 10, and carries a valve 21 herein shown as consisting of a rubber-like button which is secured in the cross width 22 of the yoke 20 by any suitable means, herein shown as by a stem 23 extending through the width 22 and carrying an annular flange 24 therearound on its outer side to hold the valve in place. A second yoke 25 telescopes from the top side over the yoke 20, and a pin, herein shown as a cotter pin 26 extends through the bottom portions of the yoke 25 and the bottom portions of the yoke 20, FIG. 3, the pin 26 passing through the slot 19. The diameter of the pin 26 is such that the two yokes thus rockably pinned one to the other may be lifted and dropped throughout the height of the slot 19. The yoke 20 carries a pair of vertically disposed ears 27 and 28 between which extends the arm 29 to be rockably engaged between those ears by any suitable means, herein shown as by a bolt 30. The arm 29 carries on its outer free end a float member 31. By means of the bolt connection of the arm 29 with the ears 27, 28, the float may be originally adjusted upwardly and downwardly in reference to the position of the yoke 20. Once this position is determined, it is not changed thereafter.

A rod 32 has its lower end rotatably interconnected with the yoke 25. The rod 32 extends up through the top cover 33 of the tank 15, screw-threadedly passing therethrough. By rotating the rod 32 by a nut 32a fixed at the top end thereof, the yoke 25 may be lifted and lowered depending upon the direction of rotation. The end 32, in the present showing, carries nuts 32b and 32c fixed to the rod above and below the yoke 25 respectively to provide the rotative connection of the rod 32 with the yoke 25. The turning of the rod 32 will cause the pin 26 to be raised or lowered accordingly in reference to the body 10. This changing in elevation of the yoke 25 likewise changes the elevation of the yoke 20 so that the valve 21 is raised and lowered accordingly in reference to the valve seat 18. Thus by raising the valve 21 the float 31 may rise higher before cutting off inflow of liquid through the body 10 and upwardly through the passageway 17 into the tank. Likewise by turning the rod 32 in the opposite direction, the valve 21 may be lowered, and cause the float 31 to be limited in its upper travel upon the valve closure. Of course the vertical height of the slot 19 may be varied within the limits of the height of the body 10 to give the desired travel of the float 31.

While the invention has been described in the one particular form, it is obvious that structural variations may be employed without departing from the spirit of the invention, and we therefore do not desire to be limited to that precise form beyond the limitations which may be imposed by the following claim.

We claim:

A valve construction comprising a body having a pair of vertically disposed, spaced apart, parallel faces and a top side; said body having a flow passageway therein discharging through a port on the top side of the body; a yoke straddling said body and extending along said faces; a hole extending transversely of the body opening through both of said faces, said hole being elongated in a vertical port closer carried by said yoke closing off said port allowing the yoke to be lifted and lowered vertically; a port closer carried by said yoke closing off said port upon rocking of the yoke on said pin; a second yoke rockably straddling said first yoke rockably carried by said pin passing through the second yoke with a running fit; a rod rotatably engaging said second yoke; a member fixed relative to said body, said rod being screw-threadedly carried by said member, turning of said rod lifting and lowering said two yokes within the limit of vertical travel of said pin in said body hole; and a yoke rocker member carried by said first yoke.

References Cited in the file of this patent
UNITED STATES PATENTS

| | | |
|---|---|---|
| 2,172,647 | Widman | Sept. 12, 1939 |
| 2,521,794 | Harvey et al. | Sept. 12, 1950 |
| 2,540,361 | Whitley | Feb. 6, 1951 |
| 2,702,562 | Bimberg | Feb. 22, 1955 |